(12) United States Patent
Devonport

(10) Patent No.: US 6,372,820 B1
(45) Date of Patent: Apr. 16, 2002

(54) POLYMERIZED MODIFIED PARTICLES AND METHODS OF MAKING THE SAME

(75) Inventor: Wayne Devonport, Tewksbury, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/564,712

(22) Filed: May 4, 2000

Related U.S. Application Data

(60) Provisional application No. 60/132,915, filed on May 6, 1999.

(51) Int. Cl.[7] ............................ C08K 9/04; C08K 3/04; C08K 3/28; C08K 9/00; C09D 11/02
(52) U.S. Cl. ..................... 523/215; 523/202; 523/205; 524/495; 524/570; 524/571; 524/575; 524/575.5; 106/31.13; 106/31.6; 152/151
(58) Field of Search ................... 523/215, 202, 523/205; 524/495, 570, 571, 575, 575.5; 106/31.6, 31.13; 152/151

(56) References Cited

U.S. PATENT DOCUMENTS

| 3,856,745 | A |   | 12/1974 | Yamaguchi et al. |
| 5,698,016 | A |   | 12/1997 | Adams et al. |
| 6,103,380 | A | * | 8/2000  | Devonport |
| 6,110,994 | A | * | 8/2000  | Cooke et al. |

FOREIGN PATENT DOCUMENTS

| EP | 0 588 287 A2 | 9/1993 |
| EP | 0 987 303 A1 | 9/1999 |
| WO | WO 99/63007  | 12/1999 |

\* cited by examiner

Primary Examiner—Tae H. Yoon

(57) ABSTRACT

Various modified particles are described which can be used in polymerizations to attach one or more polymers onto modified particles. Also described are the resulting modified particles having attached monomer or polymer groups as well as methods of preparing such modified particles. The polymer groups on the modified particles can be terminated and these various modified particles with attached groups can be used in a variety of end uses.

51 Claims, No Drawings

POLYMERIZED MODIFIED PARTICLES AND METHODS OF MAKING THE SAME

This application claims the benefit under 35 U.S.C. §119(e) of prior U.S. Provisional Application No. 60/132,915 filed May 6, 1999 which is incorporated in its entirety by reference herein.

BACKGROUND OF THE INVENTION

The present invention relates to particles, such as carbon black, having an attached or associated metal or metal containing group which permits the formation of polymer on the particle. The present invention further relates to methods of preparing and using such modified particles.

The role of carbon black as a thermal stabilizer in polymeric systems is discussed by W. L. Hawkins, R. H. Hansen, W. Matreyek, F. H. Winslow; *J. Applied Polymer Science*, vol. 1, pages 37–42, 1959; J. T. Cruver, K. W. Rollmann: *J. Applied Polymer Science*, vol. 8, pages 1169–83, 1964, and by G. Ivan, M. Giurgina: *Revue Roumaine de Chemie*, vol. 29, number 8, pages 639–646, 1984. In each discussion the mechanism is through phenolic and quinone oxygen groups on the carbon black surface behaving either as radical traps or peroxide decomposers. One skilled in the art, however, would consider these sites unavailable as initiating sites for polymerization processes.

Belmont et al. (J. A. Belmont, J. M. Funt: International Rubber Conference, Essen, Germany, Jun. 24–27, 1991) identified the presence of peroxide groups, typically in the range of 0.1 to 0.4 micromoles/sq meter, on the carbon black surface. However, the majority (greater than 80%) of the peroxide groups are thermally stable to heat treatment at 200° C. and hence cannot be considered to be potential initiating sites for radical polymerization.

Tsubokawa et al. (K. Fujiki, N. Tsubokawa, Y. Sone: *Polymer J.*, vol. 22, number 8; pages 661–70, 1990, and N. Tsubokawa: *Prog. Polymer Science*, vol. 17, pages 417–70, 1992) discuss growing polymers from an activated carbon black surface by first attaching a reactive group via the oxygen groups on the carbon black surface. Typical examples include the use of glycidyl methacrylate where the glycidyl group reacts with phenolic hydroxyl groups on the carbon black surface providing a vinyl functionality; the reaction of 4,4' azo bis-(4-cyanovaleric acid) whereby the acid group reacts with phenolic hydroxyl groups and subsequent heating decomposes the azo group to generate an alkyl radical; and the reaction of the phenolic hydroxyl groups with butyl lithium which can then be used as an initiation site for anionic polymerization.

All of these approaches require the presence of oxygen groups on the carbon black surface. Since the level of reactive hydroxyl and carboxylic acid groups, relative to the above approaches, present on a typical furnace or thermal carbon black is typically 0.01 to 0.1 micromoles/sq meter, the number of potential initiation sites is quite low.

Further, subsequent polymerization from these activated sites will most likely occur in the normal manner for free radical polymerization with the chains being irreversibly terminated by chain combination reactions, combination with unreacted oxygen groups on the carbon black surface, and/or the addition of chain stoppers. In all cases the polymerization cannot be reinitiated. Accordingly, there is a need to provide particles with attached stable free radicals which overcome the above-described limitations.

SUMMARY OF THE INVENTION

In accordance with the purposes of the present invention, the present invention relates to a modified particle which includes a particle having an attached group having the formula:

$$-A-R^1-X^+-M^- \quad (I)$$

or $$-A-R^1-X^--M^+ \quad (II),$$

or $$-A-R^1-X-M \quad (III)$$

wherein A represents an aromatic group or an alkyl group and preferably includes at least one functional group on the aromatic or alkyl group; $R^1$ represents a bond, an arylene group, an alkylene group,

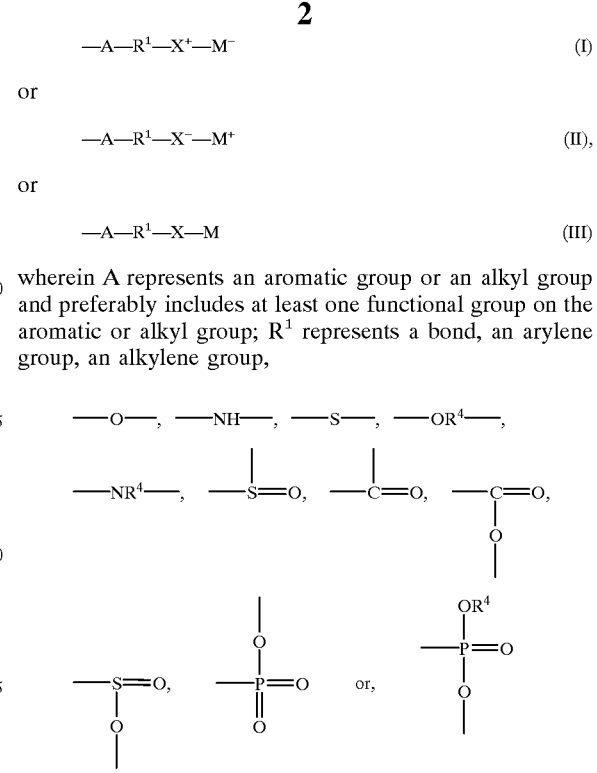

wherein $R^4$ is an alkyl or alkylene group or an aryl or arylene group; M represents a metal or metal containing group; and X represents a polymer formed from at least one polymerizable vinyl or diene containing monomer.

The present invention further relates to a modified particle or aggregate wherein the particle or aggregate is a carbon-metal containing species multiphase aggregate, a carbon-silicon containing species multiphase aggregate, a metal oxide, or a metal hydroxide. Attached to the particle or aggregate is a group having the formula:

$$-\text{CoupA}-[A-X^+-M^-]_n \quad (IV)$$

or $$-\text{CoupA}-[A-X^--M^+]_n \quad (V),$$

or $$-\text{CoupA}-[A-X-M]_n \quad (VI)$$

wherein CoupA represents a Si-containing group, a Ti-containing group, a Cr-containing group, or a Zr-containing group; A is defined above; M is defined above; X is defined above; and n is an integer of from 1 to 3.

The present invention further relates to a modified particle having an attached group of the formula:

$$-A-R^1-X-CH=CH2 \rightarrow (M)(L)_x \quad (VII),$$

wherein A, $R^1$, and M are defined above, and L represents a neutral ligand group and x represents the number of coordination sites of M and is at least 1. L can be of the same or different when x is greater than 1. The arrow in the formula represents the association or chelation of the metal or metal containing group (with or without the ligand) on the vinyl or diene containing group.

The present invention also relates to another modified particle having an attached polymer. The particle is a carbon-metal containing species multiphase aggregate, a carbon-silicon containing species multiphase aggregate, a metal oxide, or a metal hydroxide. Attached to the particle is a group having the formula:

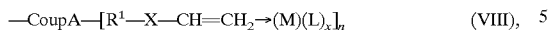
—CoupA—[R¹—X—CH=CH₂→(M)(L)ₓ]ₙ    (VIII), wherein CoupA, R¹, X, M, L, x, and the arrow (→) are defined above, and n is an integer of from 1 to 3.

The present invention, in addition, relates to a method for preparing and using these various modified particles. The method can include reacting a particle having an attached alkyl and/or aromatic group with an ionic or non-ionic metal containing group which is capable of polymerizing one or more types of monomer units which have one or more vinyl containing groups to form a reaction product, like particles having groups represented by formulas (I)–(VI). The particle having an attached alkyl and/or aromatic group will generally have a functional group as well in order to react with the metal or metal containing group. The reaction product can then be subsequently modified, such as by modifying the polymer and/or removing the metal or metal containing group.

Another method of making a modified particle can involve modifying a particle having attached a group having the formula:

—A—R¹—M    (IX), or

— — —CoupA— — —R¹—M    (X)

wherein A; CoupA; R¹; and M are defined above. M in these formulas can be non-ionic or ionic. When M is ionic in these formulas, though not shown, M would include an appropriate counter-ion. The method involves reacting a) a particle having attached an aromatic group or an alkyl group with a group containing a functional group capable of reaction with a metal or metal containing compound in such a manner that a covalent, ionic, or coordinate bond between the particle and metal or metal containing group is formed.

It is to be understood that both the foregoing general description and the following detailed description are exemplary and explanatory only and are intended to provide further explanation of the present invention, as claimed.

DETAILED DESCRIPTION OF THE PRESENT INVENTION

The present invention relates to several modified particles which can be subsequently used in a polymerization to attach one or more polymers onto the modified particles. The modified particle prior to polymerization includes a modified particle which is a particle having attached a group having the formula:

—A—R¹—M    (IX)

wherein A represents an aromatic group or an alkyl group which is attached to the particle; R¹ represents a bond, an arylene group, an alkylene group,

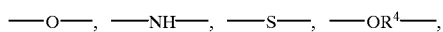
—O—, —NH—, —S—, —OR⁴—,

-continued

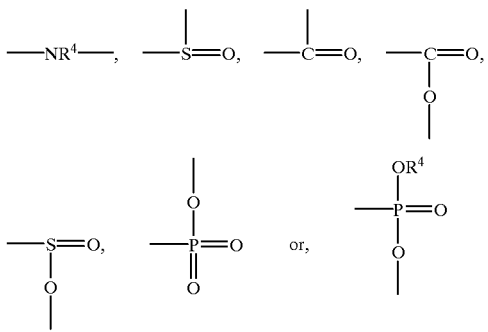

wherein R⁴ is an alkyl or alkylene group or an aryl or arylene group; and M represents at least one metal or metal containing group. In this formula, M is anionic, cationic, or non-ionic. When M is ionic (e.g., cationic or anionic), there is present a counter-ion, such as Li+, MgCl+, or SbCl₆⁻ and the like. When R¹ represents a bond, the bond for purposes of this invention, includes covalent, ionic, or coordinate bonding.

The particle, to be modified, can be any particle capable of having a group represented by any one of formulas described herein attached thereto, such as formula (I)–(VIII). Preferably, the particle has a carbon reactive site (C-) since the some of the groups represented by formulae (I)–(VIII) are preferably attached through a carbon bond on the particle. The particle, for instance, can be carbon products, colored pigments other than carbon products, metal oxides (e.g., silica), metal hydroxides, multiphase aggregates comprising at least one carbon phase and at least one silicon-containing species phase, multiphase aggregates comprising at least one carbon phase and at least one metal-containing species phase, and the like. The carbon may be of the crystalline and/or amorphous type. Examples of carbon products include, but are not limited to, graphite, carbon black, vitreous carbon, activated charcoal, activated carbon, carbon fiber, and mixtures thereof. Finely divided forms of the above are preferred. Most preferably, the particle is a carbon product, and most preferably carbon black.

The multiphase aggregate containing at least one carbon phase and at least one silicon-containing species phase can also be considered a silicon-treated carbon black aggregate and the multiphase aggregate containing at least one carbon phase and at least one metal-containing species phase can be considered to be a metal-treated carbon black aggregate as long as one realizes that in either case, the silicon-containing species and/or metal-containing species are a phase of the aggregate just like the carbon phase. The multiphase aggregates do not represent a mixture of discrete carbon black aggregates and discrete silica or metal aggregates and is not a silica coated carbon black. Rather, the multiphase aggregates used in the present invention include at least one silicon-containing or at least one metal-containing region concentrated at or near the surface of the aggregate (but part of the aggregate) and/or within the aggregate.

The aggregate, thus contains at least two phases, one of which is carbon and the other of which is a silicon-containing species, a metal-containing species, or both. The silicon-containing species that can be a part of the aggregate is not attached to a carbon black aggregate like a silica coupling agent, but actually is part of the same aggregate as the carbon phase. For instance, when the multiphase aggregate having a carbon phase and a silicon-containing species phase is examined under STEM-EDX, the silicon signal corresponding to the silicon-containing species is found to be present in individual carbon black aggregates. By comparison, for example, in a physical mixture of silica and carbon black, STEM-EDX examination reveals distinctly separate silica and carbon black aggregates.

The metal-treated carbon blacks are aggregates containing at least one carbon phase and at least one metal-containing species phase. The metal-containing species include compounds containing aluminum, zinc, magnesium, calcium, titanium, vandium, cobalt, copper, nickel, zirconium, tin, antimony, chromium, neodymium, lead, tellurium, barium, cesium, iron, and molybdenum. Preferably, the metal-containing species phase is an aluminum-or zinc-containing species phase. The metal-containing species phase(s) can be distributed through at least a portion of the aggregate and is an intrinsic part of the aggregate.

Further, it is within the bounds of the present invention to have a metal-treated carbon black containing more than one type of metal-containing species phase or the metal-treated carbon black can also contain at least one silicon-containing species phase and/or at least one boron-containing species phase. For example, the metal-treated carbon black of the present invention can have an aggregate comprising at least one carbon phase, at least one aluminum-containing species phase, and at least one zinc-containing species phase. Accordingly, the multiphase aggregates used in the present invention can have two or more different types of metal-containing species phases and/or additional non-metal species phases.

Preferably, for purposes of the present invention, the amount of elemental silicon and/or elemental metal present in the multiphase aggregate is from about 0.1 to about 25 wt. %, more preferably, from about 0.5 wt. % to about 10 wt. %, and most preferably from about 0.2 wt. % to about 5.4 wt. %, by weight of the aggregate.

The details of making the multiphase aggregates are explained in U.S. Pat. Nos. 5,830,930; 5,863,323; 5,747,562; and 5,622,557; and International Publication Nos. WO 96/37547; and WO 98/13418. All of these patent applications and publications are hereby incorporated in their entireties herein by reference.

A silica-coated carbon product can also be used as the particle, such as that described in PCT Application No. WO 96/37547, published Nov. 28, 1996, which is hereby incorporated in its entirety herein by reference.

The colored pigment is any pigment which can be modified with the attachment of an aromatic group or an alkyl group. The colored pigments other than carbon products include, but are not limited to, black, blue, brown, cyan, green, violet, white, magenta, red, yellow, as well as mixtures thereof. Suitable classes of colored pigments include, but are not limited to, anthraquinones, phthalocyanine blues, phthalocyanine greens, diazos, monoazos, pyranthrones, perylenes, heterocyclic yellows, quinacridones, and (thio) indigoids. Specific examples and further information concerning the colored pigments and methods of making colored pigments with attached aromatic groups or alkyl groups are described in PCT Publication No. WO 97/47699, incorporated in its entirety by reference herein.

Particles useful for the present invention may, for example, have primary particles sizes in the general range of from about 10 nm to about 500 nm, and preferably from about 10 nm to about 250 nm, and primary aggregate sizes in the general range of from about 50 nm to about 100 microns, preferably from about 50 nm to about 10 microns, still more preferably from about 75 nm to about 1 micron. The BET surface area of these particles can be any suitable surface area and preferably ranges from about 10 $m^2/g$ to about 2000 $m^2/g$ and more preferably, from about 10 $m^2/g$ to about 1,000 $m^2/g$, and still more preferably from about 50 $m^2/g$ to about 500 $m^2/g$; and the particle structure as measured by DBP (ASTM D-2414–97) preferably ranges from about 10 cc/100 g to about 1000 cc/g, more preferably, from about 50 cc/100 g to about 200 cc/100 g.

The number of groups, such as groups of the formula (IX) attached to the particle prior to polymerization can be any amount which can be effectively attached. For instance, the number of groups may range from about 0.01 mmole/g (of particle) to about 10 mmole/g, or from about 0.1 mmole/g to about 4 mmole/g, or from about 0.05 mmole/g to 4 mmole/g or from about 0.5 mmole/g to about 3 mmole/g, or from about 0.1 mmol/g to about 2 mmol/g. Preferably, the number of groups range from about 0.1 mmole/g to about 1.5 mmole/g.

When the particle is a multiphase aggregate, like a particle comprising a carbon phase and a silicon-containing species phase, preferably the group of formula (I), (II), (III), and (VII) is attached at least, if not exclusively, on the carbon phase.

With regard to the A group, which represents at least one aromatic group or at least one alkyl group, any aromatic group or alkyl group may be used. Unlike the polymerizable monomer discussed later, the aromatic group or the alkyl group is not a polymer and is not polymerized. Examples include, but are not limited to, arylene groups. Preferred arylene groups include, but are not limited to, phenylene and naphthalene groups. The aromatic group includes, but is not limited to, unsaturated cyclic hydrocarbons containing one or more rings. The aromatic group may be substituted or unsubstituted. Aromatic groups include aryl groups (for example, phenyl, naphthyl, anthracenyl, and the like), and heteroaryl groups (for example, imidazolyl, pyrazolyl, pyridinyl, thienyl, thiazolyl, furyl, triazinyl, indolyl, and the like). The alkyl group is preferably a $C_1$–$C_{12}$ alkyl group, and may be branched or unbranched, and is preferably ethyl.

With respect to $R^1$, preferred arylene groups include, but are not limited to, benzene ring containing groups. Preferred alkylene groups include, but are not limited to, $C_1$–$C_{18}$ alkylene-containing groups. These groups can be linear, branched, or unsaturated. These examples of arylene and alkylene groups can also be considered examples of $R^4$. Preferred alkyl groups for $R^4$ are $C_1$–$C_{20}$ alkyl groups, more preferably $C_1$–$C_5$ alkyl groups and preferred aryl groups are phenyl, biphenyl, and naphthyl.

The alkyl and aryl groups mentioned here as well as the arylene and alkylene groups mentioned throughout can be unsubstituted or substituted for purposes of the present invention.

M, which is the a metal or metal containing group, can be any ionic or non-ionic reactive group capable of capping the remaining portion of the group attached onto the particle or ionically associating with the remaining portion. Examples of M include, but are not limited to, a Group 1 or 2 metal or Group 1 or 2 metal containing group when an anionic polymerization is involved; a Group 13 or 14 metal or Group 13 or 14 metal containing group when a cationic polymerization is involved; and a transition metal or transition metal containing group when a Ziegler-Natta or metathesis type polymerization is involved. Specific examples of M include, but are not limited to, —Li, —Mg, —Ni, —Zn, —Ru, —Rh, —W, —Os, —Pt, —Pd, —Mo, —Ti, —CuCl, —$CuCl_2$, —CuBr, —$CuBr_2$, —$TiCl_3$, —$PdCl_2$, —MgCl, —$Al(Me)_2$, —SbCl$_6$, —Zn(Et)$_4$, —Pb(Et)$_4$, TiCp$_2$, —VCl$_3$, —LiAl(Et)$_4$, —Hg(Et)$_2$TiCl$_4$, —Ni—BuLi, —Pd(ac)$_2$, —HORhCl$_3^-$, —RuCl$_2$(PPh)3CHPh, —Co(CO)$_3$Co(CO)$_4$, —NiCl$_2$Ph, —Pd(PPh$_3$)$_3$, —TiCpEtClAlCl$_3$.

Another embodiment of the present invention relates to a modified particle or aggregate having a group of formula (VIII), (XI), or (XII) attached thereto. The particle can be a metal oxide, a metal hydroxide, an aggregate comprising at least one carbon phase and at least one metal-containing species phase, or an aggregate comprising at least one carbon phase and at least one silicon-containing species phase. Attached to this particle or aggregate is a group having the formula:

$$———CoupA———[A———M]_n \quad (VIII)$$

$$———CoupA———[A———M+]_n \quad (XI)$$

or $$———CoupA———[A———M^{-1}]_n \quad (XII),$$

wherein CoupA represents a Si-containing group, a Ti-containing group, a Cr-containing group; or a Zr-containing group; and A and M are defined above; and n is an integer of from 1 to 3. Preferably, CoupA is attached to the particle or aggregate, especially in the case of a Si-containing group, via an oxygen linkage which can form a part of a CoupA. As can be seen in the above formulas, M can be non-ionic or ionic.

Examples of Si-containing groups include, but are not limited to, dimethylsilylmethyl, dialkoxysilylmethyl, and the like. Examples of Ti-containing groups include, but are not limited to, alpha substituted tri-acetyl titanate and the like. Examples of Zr-containing groups include, but are not limited to, dialpha methoxy neopentylzirconate, aluminum zirconates, and the like.

The present invention further relates to a modified particle having an attached group of the formula:

$$—A—R^1—CH=CH_2\rightarrow(—M)(L)_x \quad (XIII),$$

wherein A, R$^1$, and M are defined above, and L represents a neutral ligand group and x represents the number of coordination sites of M and is at least 1. L can be of the same or different when x is greater than 1. The arrow in the formula represents the association or chelation of the metal or metal containing group (with or without the ligand) on the vinyl or diene containing group.

The present invention also relates to another modified particle having an attached polymer. The particle is a carbon-metal multiphase aggregate, a carbon-silicon containing species multiphase aggregate, a metal oxide, or a metal hydroxide. Attached to the particle is a group having the formula:

$$—CoupA—[R^1—CH=CH_2\rightarrow(—M)(L)_x]_n \quad (XIV),$$

wherein CoupA, R$^1$, M, L, x, n, and the arrow (→) are defined above.

With respect to the ligand group (L), examples include, but are not limited to, phosphenes, amines, alkenes, dienes, nitriles, halides, sulfides, alcohols, alkyls, aryls, arene alkylidenes, arylidenes, carbonyls, nitroso compounds, and the like. Specific examples includes, but are not limited to, triphenylphosphene, carbon monoxide, trimethylene, cyclopentadiene, cyclooctadiene, ferrocene, acetonitrile, chlorine, phenylsulfide, methanol, ethyl, benzylidene, nitric oxide, and the like.

The modified particles having the attached group of the formulas, such as formula (IX), can be made in the following manner. A particle, such as carbon black, can first have a vinyl substituted aromatic group or a vinyl substituted alkyl group attached to the particle. This attachment can be accomplished by the methods described in PCT International Application No. WO 96/18688 and U.S. Pat. Nos. 5,630,868; 5,559,169; 5,571,311; and 5,559,169 as well as U.S. patent application Ser. No. 08/572,525, all of which are hereby incorporated in their entireties by reference herein.

The particle having the attached vinyl substituted aromatic group or the vinyl substituted alkyl group is then reacted with a Lewis acid, such as a metallic Lewis acid and optionally a co-catalyst, for a sufficient time and at a sufficient temperature to form the modified particle having the attached group, like that of formula (IX). The co-catalyst can be considered a co-reagent or proton donor for purposes of the present invention. The amount of the Lewis acid can be any amount sufficient to permit the formation of one of the groups attached onto the particle as set forth in the above-described formulas. For example, the amount of Lewis acid can be from about 0.01 mmol/g to about 10 mmol/g, and preferably from about 0.1 mmol/g to about 4 mmol/g. Other amounts can be used as well. Examples of the co-catalyst include, but are not limited to, chloroethanol, ethane, ether, chlorobenzene, water, chloroform, n-hexane, ethanol, chloroform containing HCl, HBr, or HF, chloroethane containing potassium hydroxide, chloroform containing acetone, sulfuric acid, and the like. The co-catalyst can be present in amounts sufficient to react with the vinyl aromatic group or vinyl alkyl group present on the particle. Preferably, the amount of the co-catalyst, if present, is from about 0.01 mmoles/g (of particle) to about 10 mmoles/g and more preferably from about 0.01 to about 5 mmoles/g.

Alternatively, the modified particles of the present invention can be made by first forming the groups of the formulas described above, such as formula (IX). Preferably, the —M group is attached in the meta or para position of the aromatic group, if one is used. The group having the aromatic group or alkyl group with the —M group is then attached to the particle by a diazonium treatment in the manner described in the above referenced patents and patent applications, where a diazonium salt will first be formed containing a group having one of the formulas described above in the manner described in the above-referenced patents. The groups represented by the formulas can be then subsequently attached to the particle. In a less preferred way, the formulas of the present invention can be attached to the particle through a hydroxyl or carbonyl group present on the particle. Also, the modified particle of the present invention can be formed by attaching a —M group containing at least one alkoxy silyl, alkoxy titanyl, or alkoxy zirconyl group to the particle which, in this particular process is preferably a metal oxide or metal hydroxide, or a carbon surface. This particular embodiment would attach a group of formula (IV), (V), or (VI) to a particle.

In another process, the modified particle can be formed by first taking an aromatic group or an alkyl group and reacting it with a compound to form the groups of the formulas described above except for the presence of the —M group. In other words, a group having the formula A—R$^1$ would first be formed and then the —M would be attached to this group to form a group of formula (IX) of the present invention which can then be attached to the particle. In this process, R$^1$ is preferably a group containing an olefin, alkyl, or aryl halide.

A related process involves first taking an aromatic group or an alkyl group, such as a group having the formula A—R$^1$ and attaching it onto the particle, for instance by a diazonium treatment in a manner described above, and then attaching the —M group to form a group of formula (IX) of the present invention. In more detail, this process preferably involves reacting a metal or metal containing compound with a carbon centered radical, pi-electron, donating group, halide, or an olefinic bond, which is attached onto an aromatic group or an alkyl group, wherein the aromatic group or the alkyl group is directly attached to the particle. For purposes of this process, the aromatic group or the alkyl group can first be attached to the particle and then subsequently a group containing a metal reactive moiety can then be attached or an aromatic group or an alkyl group containing a metal reactive moiety can be attached onto the particle, for instance, by a diazonium treatment as described above. Then, at least one metal or metal containing compound is reacted with the particle having the attached aromatic group or alkyl group with the group containing the metal reactive moiety for a sufficient time and at a sufficient temperature to form the modified particle having the attached group, like that of formula (IX).

This modified particle having the attached group, like that of formula (IX) can then be subjected to polymerization reactions in order to have polymers attached thereto such as set forth in formulas (I), (II), (III), and (VII). In this process, the active metal center is reacted, or associated with a metal reactive, or coordinating site on the solid particle which permits the metal or metal containing group to attach thereto to create the modified particles of the present invention such as set forth in formula (I), (II), (III), and (VII). Examples of a metal reactive site, or coordinating site include, but are not limited to, alkyl groups, alkenes with a hydrogen atom in the alpha position to the olefinic bond, nitrites, phosphines, thiol, and other such donors of $\pi$-electrons and the like. Specific examples include $C_1$–$C_{20}$ alkyl groups, such as methyl, ethyl, propyl, butyl, and the like. This process can also be applied where the modified particle aggregate has a group attached like that of formula (IV), (V), or (VI).

Alternatively, the process of making the modified particles of the present invention can be a three step process where the alkyl or aromatic group is first attached to the particle and then the group having the formula $R^1$ can be attached to the aromatic group or alkyl group. Then in a third step, the —M can be attached to the —A—$R^1$ group.

Also, in making the modified particles having the attached group of one the formulas described above, an aliphatic vinyl group can be attached to the particle surface by a diazotisation of a vinyl substituted amino aromatic or alkyl compound, or a vinyl substituted alkoxy silyl, titanyl, or zirconyl derivative. The vinyl group is then reacted with a metal or metal containing compound such that the active metal species are present in an amount sufficient to react with at least one percent of the vinyl groups and preferably from about 50 to about 100% of the vinyl groups and the mole ratios of the vinyl group to metal or metal containing group are preferably from about 1:1 to about 1:100, and more preferably at a ratio of less than 1:10.

The modified particles of formula (IV), (V), or (VI) can be made in the following manner. The aggregate comprising at least one carbon phase and at least one metal-containing species phase can be made as described in U.S. Pat. No. 6,017,980, hereby incorporated herein by reference. The aggregate comprising at least one carbon phase and at least one silicon containing species phase can be made as described in U.S. Pat. Nos. 6,008,272; 5,948,835, and 5,919, 841. The aggregate or particle can then be reacted with a coupling agent by adding the coupling agent to the aggregate in a medium and mixing. Then, the aggregate or particle having the attached coupling group can be reacted with a Lewis acid source as described above.

For purposes of the above-described reactions, the reaction should occur for a time and temperature sufficient to form the attached group onto the particle or aggregate. Generally, this time is from about 3 minutes to about 96 hours and more preferably from about 1 hour to about 24 hours. The temperature of the reaction is dependent on the half-life of the active species, preferably from about –75° C. to about 200° C., and more preferably from about 20° C. to about 125° C.

For the various methods described above, any appropriate solvent, aqueous or non-aqueous, can be used. Preferably, the solvent does not interfere with the active species bound on the particle. More preferably, the solvent is toluene, benzene, or xylene. Mixtures of various solvents can be used as well.

With the modified particles described above, polymers can be attached onto these attached groups by reacting these modified particles or aggregates with one or more polymerizable monomer(s) such as a vinyl or diene containing monomer. Specific examples of such monomers include, but are not limited to, propene, ethene, isobutylene, isoprene, butadiene, acenaphthylene, cyclopentadiene, norbornene, styrene, 3-methylbut-1-ene, 2,5-dimethylhexa-2,4-diene, isobutylvinylether, methylvinylether, chloromethylstyrene, methyl methacrylate, and butyl methacrylate, as well as acrylic acid and esters of acrylic acid and methacrylic acid and esters of methacrylic acid. More specific examples of monomers include, but are not limited to, styrene, acetoxystryrene, chloromethylstyrene, hydroxyalkyl (meth) acrylates, such as hydroxyethyl (meth)acrylate, hydroxyproyl (meth)acrylate; alkyl (meth)acrylates such as methyl acrylate or butyl acrylate; glycidyl (meth)acrylate; dimethylaminoethylacrylate; 2-acryl trimethyl ethylammonium chloride; aminoethyl acrylate; acrylonitrile; vinyl acetate, and the like. Mixtures of two or more monomers can be also used and/or polymerized sequentially. For purposes of the present invention, the vinyl containing monomer includes vinyl containing monomers having additional olefinic groups which are conjugated or unconjugated to the vinyl containing monomer.

The polymerization reaction is conducted under conditions which permits the polymerization of the monomer so that it forms a part of the group attached onto the particle or aggregate. Polymerization conditions may be specific to the specific polymerization mechanism, but may be varied from –20° to about 150° C., optionally in the presence of a solvent. The reaction can be ended by lowering, or raising the temperature outside the optimum reaction parameters. The polymer-modified particle can then be subjected to distillation, steam stripping, or precipitation or other known methods in order to remove residual monomers and solvents.

The polymerization reaction thus can produce any length of polymer on the modified particle or aggregate. For example, polymers having average molecular weights, preferably ranging from about 500 to about 1,000,000 can be made. Other ranges of average molecular weights include, but are not limited to, from about 500 to about 3,000, and from about 500 to about 2,000, and from about 500 to about 500,000, and from about 1,000 to about 250,000. The polymers can be any type, such as homopolymers, co-polymers, ter-polymers, or higher chain polymers. The polymers can also be block, graft, or random-type polymers. The polymers can be branched or unbranched. Polymers, such as comb polymers, can be formed or located off of the main polymer chain, and these polymers can be any type of polymer. Specific examples include, but are limited to, polyamines, such as polyethyleneimine or polyalkylene oxides, grafted onto the main polymer chain. The polymers that are formed can be ionic (e.g., cationic or anionic) or non-ionic polymers. Specific examples of polymers include, but are not limited to, polyamides, polyacrylics, polyvinylacetates, polyvinylalcohols, polyvinylpyridines, polyvinylpyrrilodones, polyvinylimidazoles, and acrylamides and derivatives thereof as well as combinations thereof.

Once the polymerization occurs, the modified particle can have a group attached having the formula:

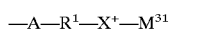    (I)

or

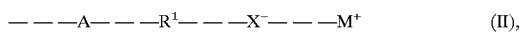    (II), or

    (III)

wherein the substituents are the same as described earlier for formula (VII) and X represents a polymer formed from at least one polymerizable vinyl or diene containing monomer.

Similarly, when the modified particle or aggregate having a group of formula (VIII) is polymerized by the introduction of one or more monomers, the group attached to the particle or aggregate will have the formula:

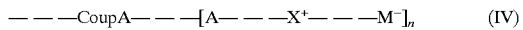    (IV)

or

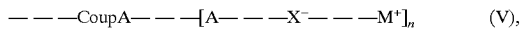    (V), or

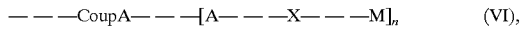    (VI), wherein the substituents are the same as described in formula (X) and X represents a polymer formed from at least one polymerizable vinyl or diene containing monomer.

Also, when the modified particle or aggregate having a group of formula (XIII) is polymerized by the introduction of one or more monomers, the group attached to the particle or aggregate will have the formula:

    (VII), wherein A, $R^1$, X, and M are defined above, and L represents a neutral ligand group and x represents the number of coordination sites of M and is at least 1. L can be of the same or different when x is greater than 1. The arrow in the formula represents the association or cheleting of the metal or metal containing group (with or without the ligand) on the vinyl or diene containing group.

In addition, when the modified particle or aggregate having a group of formula (XIV) is polymerized by the introduction of one or more monomers, the group attached to the particle or aggregate will have the formula:

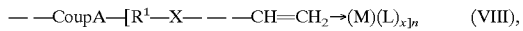    (VIII), wherein CoupA, $R^1$, X, M, L, x, n, and the arrow ($\rightarrow$) are defined above.

With any of the above-described groups containing the —M group, the modified particle or aggregate containing the —M group or the polymerized versions thereof can be terminated by any means known to those skilled in the art in view of the present application so that a terminated moiety (—T) is located in the position of the —M group in the formulas above. In particular, the —M group can be replaced with a proton (e.g., hydrogen atom), subjected to disproportionation, or replaced with a chemical group through group transfer and the like. For instance, the —M group can be replaced with another or second metal containing group (e.g., tin or tin compound), a hydroxy group, or a halide group. For purposes of the present invention, the terminated moiety includes any chemical group capable of forming a chemical bond by substitution or replacement of the —M group, by one or multiple steps. For instance, the hydroxy group or halide group replacing the —M group can then be subsequently modified or replaced with chemical groups, such as organic groups, by such means as conventional oxidation reactions known to those skilled in the art. This termination of removing the —M group and replacing it or terminating it with another group can be accomplished, for instance, by methods described in 217 ACS Nat'l Mtg, Las Vegas, Sep. 7–11, 1997, Paper in ORGN O61, Gravert, D. J.; Datta A.; Wentworth P., Jr.; Janda, K. D.; 214 ACS Nat'l Mtg, Anaheim, Mar. 21–25, 1999, Paper in PMSE 135, M. K. Georges et al.; all of which are incorporated in their entirety by reference herein.

The modified particles of the present invention, and preferably the polymerized and terminated versions of the modified particles of the present invention, can form part of a polymeric composition and be present with other ingredients commonly used and found in polymeric compositions.

The modified particle of the present invention can be used in a variety of applications. For instance, it can be used in coating formulations or compositions, ink formulations or compositions, or toner formulations or compositions, such as printing inks and inkjet inks, dry or liquid toners, automobile coatings, and the like. Also, the modified particles can be used as reinforcers for compositions, such as polymeric compositions and can also serve as impact modifiers, or as agents used to increase compatibility of a polymeric composition.

In more detail, reinforcement of elastomeric compositions including tire, hose, profile extrusion, seals, gaskets, and vibration isolation units, as well as the specific reinforcement of a single elastomer phase in a multiphase elastomer blend composition; reinforcement of thermoplastic compositions such as polyolefines, styrenic, acrylics, polyesters and polyamides, and thermoplastic elastomers and thermoplastic polyolefins; reinforcement of thermoset compositions, e.g., acrylics; impact modification of thermoplastic compositions; impact modification of thermosets; highly dispersible masterbatch for pigmentation, reinforcement, and/or UV protection of thermoplastic compositions, coatings, thermoplastic elastomers, and crosslinked compositions; as a synthetic support for solid phase organic synthesis; as a support or medium for effluent extraction processes—both organic and inorganic components; as a catalyst support; and/or as a superadsorbant for either aqueous of hydrocarbon materials, e.g., use in sanitary wear, growing medium for plants.

The modified particles of the present invention can be incorporated in and form a part of elastomeric compositions. Other conventional ingredients for elastomeric compositions can also be present, such as coupling agents and the like.

Coupling agents, as used herein, include, but are not limited to, compounds that are capable of coupling fillers such as carbon black or silica to an elastomer having one functionality which will attach to the particle and another functionality which will attach to the elastomer. Coupling agents useful for coupling silica or carbon black to an elastomer can be used with the elastomeric compositions of the present invention. Useful coupling agents include, but are not limited to, silane coupling agents such as bis(3-triethoxysilylpropyl)tetrasulfane (Si-69), 3-thiocyanatopropyl-triethoxy silane (Si-264, from Degussa AG, Germany), γ-mercaptopropyl-trimethoxy silane (A189, from Union Carbide Corp., Danbury, Conn.); zirconate coupling agents, such as zirconium dineoalkanolatodi(3-mercapto)propionato-O (NZ 66A, from Kenrich Petrochemicals, Inc., of Bayonne, N.J.); titanate coupling agents; nitro coupling agents such as N,N'-bis(2-methyl-2-nitropropyl)-1,6-diaminohexane (Sumifine 1162, from Sumitomo Chemical Co., Japan); polyalkoxysiloxane (e.g. Zeruma from the Yokohama Rubber Co. Ltd., Japan) and mixtures of any of the foregoing. The coupling agents may be provided as a mixture with a suitable carrier, for example X50-S which is a mixture of Si-69 and N330 carbon black, available from Degussa AG.

The elastomeric compounds of the present invention may be prepared from the modified particles of the present invention by compounding with any elastomer including those useful for compounding carbon black.

Any suitable elastomer may be compounded with the modified particles to provide the elastomeric compounds of the present invention. Such elastomers include, but are not limited to, homo- or co-polymers of 1,3 butadiene, styrene, isoprene, isobutylene, 2,3-dimethyl-1,3-butadiene, acrylonitrile, ethylene, and propylene Preferably, the elastomer has a glass transition temperature (Tg) as measured by differential scanning colorimetry (DSC) ranging from about –120° C. to about 0° C. Examples include, but are not limited, styrene-butadiene rubber (SBR), natural rubber, polybutadiene, polyisoprene, and their oil-extended derivatives. Blends of any of the foregoing may also be used.

Among the rubbers suitable for use with the present invention are natural rubber and its derivatives, such as chlorinated rubber and epoxidized rubber. The modified particles of the present invention may also be used with synthetic rubbers such as: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chloromethylstyrene, acrylonitrile, 2-vinyl-pyridine, 5-methyl 2-vinylpyridine, 5-ethyl-2-vinylpyridine, 2-methyl-5-vinylpyridine, alkyl-substituted acrylates or methacrylates, vinyl ketone, methyl isopropenyl ketone, methyl vinyl ether, alpha-methylene carboxylic acids and the esters and amides thereof such as acrylic acid, methacrylic acid, and dialkylacrylic acid amide; also suitable for use herein are copolymers of ethylene and other high alpha olefins such as propylene, butene, pentene, hexene, and octene. Other monomers that could be used include norbornene and hex-1,5-diene, and the like.

The rubber compositions of the present invention can therefore contain one or more elastomers, curing agents, reinforcing fillers, coupling agents, and, optionally, various processing aids, oil extenders, and antidegradents. In addition to the examples mentioned above, the elastomer can be, but is not limited to, polymers (e.g., homopolymers, copolymers, and terpolymers) manufactured from 1,3 butadiene, styrene, isoprene, isobutylene, 2,3-dimethyl-1,3-butadiene, acrylonitrile, ethylene, propylene, and the like. It is preferred that these elastomers have a glass transition point (Tg), as measured by DSC, between –120° C. and 0° C. Examples of such elastomers include poly(butadiene), poly(styrene-co-butadiene), and poly(isoprene).

Elastomeric compositions disclosed in the present invention include, but are not limited to, vulcanized compositions (VR), thermoplastic vulcanizates (TPV), thermoplastic elastomers (TPE) and thermoplastic polyolefins (TPO). TPV, TPE, and TPO materials are further classified by their ability to be extruded and molded several times without loss of performance characteristics.

The elastomeric compositions may include one or more curing agents such as, for example, sulfur, sulfur donors, activators, accelerators, peroxides, and other systems used to effect vulcanization of the elastomer composition.

The resultant elastomeric compounds containing the aggregates of the present invention and optionally containing one or more coupling agents may be used for various elastomeric products such as a tread compound, undertread compound, sidewall compound, wire skim compound, innerliner compound, bead, apex, any compound used in carcass and other components for vehicle tires, industrial rubber products, seals, timing belts, power transmission belting, and other rubber goods.

In an embodiment of the present invention, the elastomeric compositions of the present invention, which contain at least one modified particle of the present invention, can have a total residue after nitrogen pyrolysis at 650° C. of from about 1% to about 60% by weight.

For purposes of the present invention, the ink includes at least one type of polymerized-terminated modified particle, and at least one ink vehicle. The inkjet ink formulation includes at least one type of polymerized terminated modified particle, and at least one inkjet ink vehicle. Generally, the formulations described in WO 97/47699 with respect to coatings and inks can be used herein, however, incorporating the modified particles of the present invention. The coating formulations contain at least one type of polymerized-terminated modified particle and at least one liquid vehicle or suitable solvent. Other conventional additives may be incorporated into the coating formulations, such as a binder.

Each of these formulations can contain additional conventional colorants and other optional, conventional ingredients or additives, for instance as described in U.S. Pat. Nos. 5,571,311; 5,672,198; 5,266,361; 5,707,432 such as a humectant, binders, dyes, biocides, surfactants, penetrants. All of these patents as well as any patents, patent applications, and publications lo referred to throughout this application are incorporated herein in their entirety by reference herein. The toner can contain at least one polymerized-terminated modified particle and resin particles.

The conventional and standard ingredients or additives for toner formulations, such as those described in U.S. Pat. Nos. 5,278,018; 5,275,900; 5,695,899 and 5,116,712, can be used in the present invention, and are incorporated in their entirety by reference herein. The toner can be a positively or negatively charged toner composition.

In the various products incorporating the modified particles of the present invention, one or more types of other particles can also be present, such as a carbon product (e.g., carbon black, carbon fiber, activated carbon, and the like), metal oxide (e.g., silica, zinc oxide, and aluminum oxide), metal silicate (e.g., clay, aluminum, calcium, magnesium silicates), modified silica, modified carbon products having an attached organic group, an aggregate comprising at least one carbon phase and at least one silicon-containing species phase optionally having an attached organic group, carbon black at least partially coated with silica, or any combination thereof. In any product mentioned herein, more than one type of modified particle of the present invention can be present in the various products described above.

The present invention can further be exemplified by the following reaction schemes, which are provided as examples and not intended to limit the present invention.

Cationic Polymerization

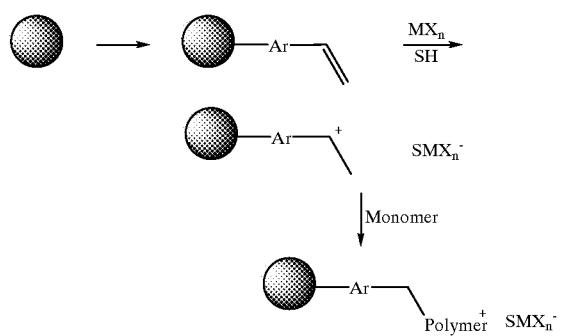

$MX_n$ is a Metallic Lewis Acid and SH is a co-catalyst. Carbon bound initiators include, but are not limited to:

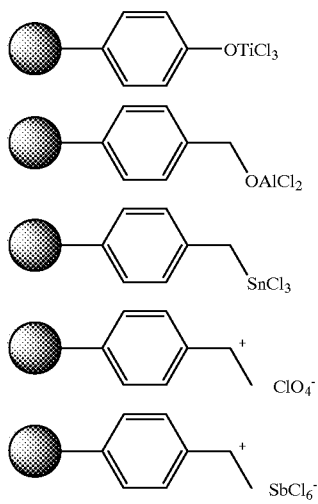

Monomers include, but are not limited to vinyl monomers such as alkyl olefins, vinyl ethers, styrenics, dienes. In addition, it is possible to perform cationic polymerization by ring opening as follows:

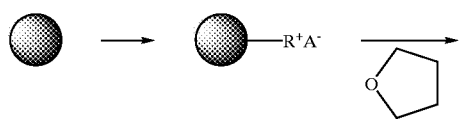

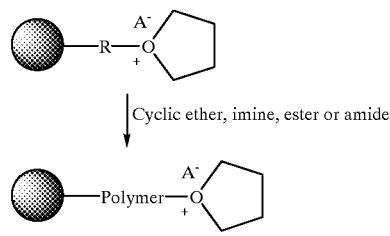

Anionic Polymerization

The nature of the invention is the synthesis of carbon black bound and carbon black dual phase initiators for and subsequent use of in anionic polymerizations. Benefits include improved dispersion, increased cut and chip resistance and improved hysteresis. Polymerization is the addition of an olefinic monomer to an anionically charged end group. Monomers include: acrylics, styrenics, dienes and other vinyl monomers. Typical initiators include, but are not limited to Grignard reagents and organolithium species. Examples include: alkyllithiums, phenyl lithiums, vinyl lithiums and lithium naphthalide.

The present invention would bind these species to carbon black or other particles.

General Scheme:

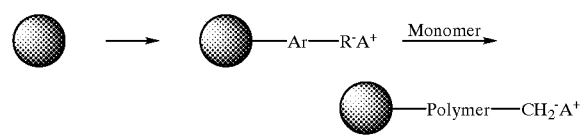

Examples of carbon bound initiators include, but are not limited to:

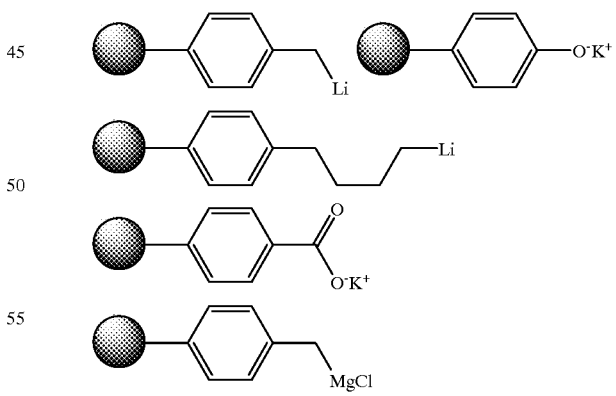

As shown by the above reaction schemes, a variety of reaction mechanisms can be used, including ring-opening mechanisms.

The present invention will be further clarified by the following examples, which are intended to be exemplary of the present invention.

EXAMPLE

Example 1

Anionic Polymerization of Polystyrene from a Modified Carbon Black Preparation of Chloroaniline Modified Black 1

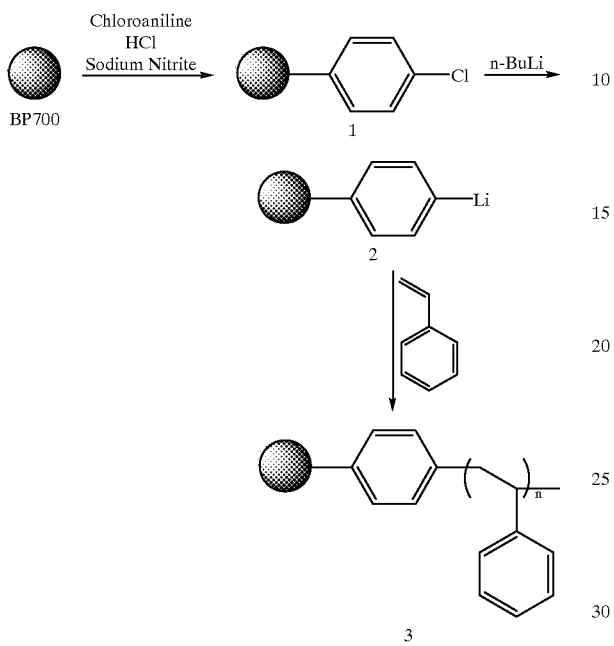

Preparation of Chloroaniline Modified Black 1

Material 1 was prepared by diazonium conditions detailed in U.S. Pat. Nos. 5,900,029 and 5,630,868, incorporated in their entirety by reference herein.

To a slurry of Black Pearls® 700 Carbon Black (100 g) in water (800 mL) was added chloroaniline (0.12 mol) and hydrochloric acid (0.35 mol, 37 wt % in water). The mixture was stirred at 20° C. for 10 min, before addition of a solution of sodium nitrite (0.16 mol) in water (100 mL). The mixture was stirred at 20° C. for 5 hours before being isolated by filtration and purified by Soxhlet extraction with toluene for 48 hours. The purified material was dried in a vacuum oven at 70° C. for 48 hours. Chlorine content was determined by elemental analysis=0.66 mmol/g.

In Situ Preparation of Metallated Carbon Black and Subsequent Polymerization of Styrene: Materials 2 and 3

Carbon black (1 g, 0.66 mmol) was slurried in anhydrous tetrahydrofuran (10 mL) and cooled to −78° C. n-Butyl lithium (2.5 M in hexane, 0.66 mmol) was added dropwise and allowed to stir for 90 minutes to form material 2. Distilled styrene (24 mL) was added dropwise to the cooled mixture and allowed to stir at −78° C for 45 minutes, until a sharp increase in viscosity was noted. The reaction was neutralized by dropwise addition of methanol (0.2 mL). Toluene was added and the mixture precipitated as a black powder into methanol. The material was then Soxhlet extracted with toluene overnight. The extracted material was re-dissolved into toluene and allowed to form a sediment over 24 hours. Sedimentation was repeated 5 times before isolation of material 3 by filtration and drying in a vacuum oven. Analysis by thermogravimetric analysis indicated a thermal decomposition at 376° C., indicative of polystyrene. Polystyrene content (TGA): 64%.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A modified particle comprising a particle having attached a group having the formula:

$$—A—R^1—X^+—M^- \quad (I)$$

or $$—A—R^1—X^-—M^+ \quad (II)$$

or, $$—A—R^1—X—M \quad (III),$$

wherein A represents an aromatic group or an alkyl group and optionally includes at least one functional group on the aromatic or alkyl group; $R^1$ represents a bond, an arylene group, an alkylene group,

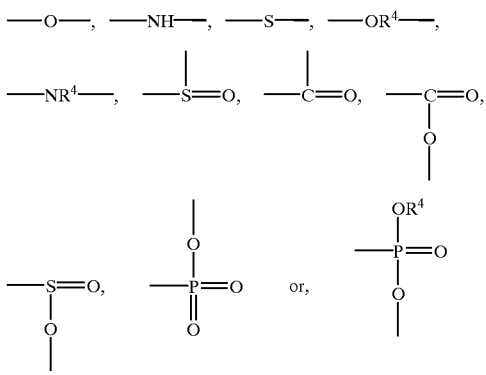

wherein $R^4$ is an alkyl or alkylene group or an aryl or arylene group; M represents a metal or metal containing group; and X represents a polymer formed from at least one polymerizable vinyl or diene containing monomer.

2. The modified particle of claim 1, wherein said particle is a carbon product, a colored pigment other than a carbon product, a metal oxide, a metal hydroxide, or mixtures thereof.

3. The modified particle of claim 1, wherein said particle is graphite, vitreous carbon, activated charcoal, carbon fiber, activated carbon, or mixtures thereof.

4. The modified particle of claim 1, wherein said particle is carbon black.

5. The modified particle of claim 1, wherein said particle is an aggregate comprising at least one silicon-containing species phase and at least one carbon phase.

6. The modified particle of claim 1, wherein said particle is an aggregate comprising at least one metal-containing species phase and at least one carbon phase.

7. The modified particle of claim 1, wherein said M is a Group 1 or 2 metal or metal containing group when anionic polymerization is involved; a group 13 or 14 metal or metal containing group when a cationic polymerization is involved and a transition metal or metal containing group when a Ziegler-Natta or metathesis polymerization is involved.

8. A modified particle or aggregate comprising a) an aggregate comprising at least one carbon phase and at least one metal-containing species phase, an aggregate comprising at least one carbon phase and at least one silicon-containing species phase, a metal oxide, or a metal hydroxide and b) attached to said particle or aggregate, a group having the formula:

—CoupA—[A—X$^+$—M$^-$]$_n$ (IV)

or

—CoupA—[A—X$^-$—M$^+$]$_n$ (V), or

—CoupA—[A—X—M]$_n$ (VI), wherein CoupA represents a Si-containing group, a Ti-containing group, a Cr-containing group, or a Zr-containing group; M represents a metal or metal containing group; and X represents a polymer formed from at least one polymerizable vinyl or diene containing monomer; and n represents an integer of from 1 to 3.

9. The modified particle or aggregate of claim 8, wherein said M is a Group 1 or 2 metal or metal containing group when anionic polymerization is involved; a Group 13 or 14 metal or metal containing group when a cationic polymerization is involved and a transition metal or metal containing group when a Ziegler-Natta or metathesis polymerization is involved.

10. The modified particle or aggregate of claim 8, wherein said particle or aggregate is an aggregate comprising a carbon phase and a metal-containing species phase or an aggregate comprising a carbon phase and silicon-containing species phase.

11. A modified particle comprising a particle having attached a group having the formula:

—A—R$^1$—X—CH═CH2→(M)(L)$_x$ (VII), wherein A represents an aromatic group or an alkyl group and optionally includes at least one functional group on the aromatic or alkyl group; R$^1$ represents a bond, an arylene group, an alkylene group,

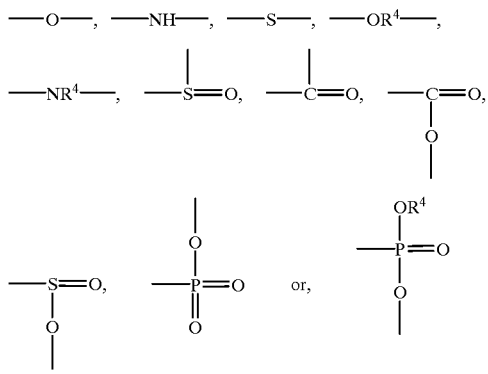

wherein R$_4$ is an alkyl or alkylene group or an aryl or arylene group; M represents a metal or metal containing group; X represents a polymer formed from at least one polymerizable vinyl or diene containing monomer; L represents a neutral ligand group and x represents the number of coordination sites of M and is at least 1 and L is the same or different when x is greater than 1 and the arrow in the formula represents the association or chelation of the metal or metal containing group, with or without the ligand, on the vinyl or diene containing group.

12. The modified particle of claim 11, wherein said particle is a carbon product, a colored pigment other than a carbon product, a metal oxide, a metal hydroxide, or mixtures thereof.

13. The modified particle of claim 11, wherein said particle is graphite, carbon black, vitreous carbon, activated charcoal, carbon fiber, activated carbon, or mixtures thereof.

14. The modified particle of claim 11, wherein said particle is an aggregate comprising at least one silicon-containing species phase and at least one carbon phase.

15. The modified particle of claim 11, wherein said particle is an aggregate comprising at least one metal-containing species phase and at least one carbon phase.

16. The modified particle of claim 11, wherein said particle is carbon black.

17. The modified particle of claim 11, wherein said M is a Group 1 or 2 metal or metal containing group when anionic polymerization is involved; a Group 13 or 14 metal or metal containing group when a cationic polymerization is involved and a transition metal or metal containing group when a Ziegler-Natta or metathesis polymerization is involved.

18. A modified particle or aggregate comprising a) an aggregate comprising at least one carbon phase and at least one metal-containing species phase, an aggregate comprising at least one carbon phase and at least one silicon-containing species phase, a metal oxide, or a metal hydroxide and b) attached to said particle or aggregate a group having the formula:

—CoupA—[R$^1$—X—CH═CH$_2$→(M)(L)$_x$]$_n$ (VIII), wherein CoupA represents a Si-based group, a Ti-based group, a Cr-based group, or a Zr-based group; M represents a metal or metal containing group; X represents a polymer formed from at least one polymerizable vinyl or diene containing monomer; n is an integer of from 1 to 3; L represents a neutral ligand group and x represents the number of coordination sites of M and is at least 1 and L is the same or different when x is greater than 1 and the arrow in the formula represents the association or chelation of the metal or metal containing group, with or without the ligand, on the vinyl or diene containing group.

19. The modified particle or aggregate of claim 18, wherein said particle or aggregate is an aggregate comprising at least one carbon phase and at least one metal-containing species phase or an aggregate comprising at least one carbon phase and at least one silicon-containing species phase.

20. The modified carbon-metal aggregate of claim 18, wherein said M is a Group 1 or 2 metal or metal containing group when anionic polymerization is involved; a Group 13 or 14 metal or metal containing group when a cationic polymerization is involved and a transition metal or metal containing group when a Ziegler-Natta or metathesis polymerization is involved.

21. A method for preparing the modified particle of claim 1, comprising reacting a particle having an attached vinyl or diene substituted aromatic group or alkyl group with an active metal or metal containing compound for a sufficient time and at a sufficient temperature to form a modified particle having the formula —A—R$^1$—M and conducting a polymerization reaction with a polymerizable vinyl or diene containing monomer to form the modified particle of claim 1.

22. The method of preparing the modified particle of claim 21, comprising reacting a modified particle having the formula —A—R$^1$—M with a polymerizable vinyl or diene containing.

23. An elastomeric composition comprising at least one elastomer and a terminated version of the modified particles of claim 1, and optionally a coupling agent.

24. The elastomeric composition of claim 23, wherein said elastomer comprises natural rubber, polyisoprene, polybutadiene, emulsion styrene-butadiene rubber, solution styrene-butadiene rubber, functionalized styrene-butadiene rubber, nitrile-butyl rubber, butyl rubber, ethylene-propylene-diene monomer, ethylene-propylene copolymer, or homo- or co-polymers based on or containing 1,3 butadiene, styrene, isoprene, isobutylene, 2,3methyl-1,3-butadiene, acrylonitrile, ethylene, or propylene.

25. The elastomeric composition of claim 23, further comprising a crosslinking agent, reinforcing filler, a coupling agent, processing aids, oil extenders, antidegradents, or combinations thereof.

26. The elastomeric composition of claim 23, further comprising silica, carbon black, or mixtures thereof.

27. The elastomeric composition of claim 23, further comprising silica, carbon black, modified carbon black having an attached organic group, modified silica, carbon black at least partially coated with silica, an aggregate comprising at least one carbon phase and at least one silicon-containing species phase, an aggregate containing at lease one carbon phase and at least one metal-containing species phase, or combinations thereof.

28. The elastomeric composition of claim 23, wherein said elastomeric composition has low hysteresis at high temperature, wherein said high temperature is from 20 to 100° C.

29. A tire or compound thereof comprising the elastomeric composition of claim 23.

30. An article comprising at least one component made from the elastomeric composition of claim 23.

31. The article of claim 30, wherein said article is a tire component, a timing belt, or a power transmission belt.

32. A method of making a modified particle of claim 1, comprising reacting a) a particle having attached an aromatic group or an alkyl group with a group containing an covalently, ionically or coordinated metal center capable of addition of olefin containing species with a vinyl containing monomer, optionally in the presence of solvent under such conditions of temperature that result in polymerization, and reacting with a polymerizable monomer to form the modified particle.

33. The method of claim 32, wherein said particle is a carbon product, a metal oxide, a metal hydroxide, or mixtures thereof.

34. The method of claim 32, wherein said particle is graphite, vitreous carbon, activated charcoal, carbon fiber, activated carbon, or mixtures thereof.

35. The method of claim 32, wherein said particle is carbon black.

36. The method of claim 32, wherein said particle is an aggregate comprising a silicon-containing species phase and a carbon phase.

37. The method of claim 32, wherein said particle is an aggregate comprising a metal-containing species phase and a carbon phase.

38. The method of claim 32, wherein said reactive metal center, optionally comprises coordinated ligand groups.

39. The method of claim 32, wherein said group which contains an active metal center and is capable of leaving behind an active metal center and comprises of an alkyl group or an alkene group with a hydrogen atom in the alpha position to the olefinic bond, a carbocation, carbanion, or a metal alkylidine.

40. The method of claim 32, wherein said group which contains an active metal center and is capable of leaving behind a carbon-centered radical comprises a $C_1$–$C_{20}$ alkyl group.

41. The method of claim 40, wherein said $C_1$–$C_{20}$ alkyl group is a methyl, ethyl, propyl, butyl, or hexyl group.

42. The method of claim 32, wherein said aromatic group or alkyl group is first attached onto the particle and then said group containing an active metal center is then attached onto the aromatic group or alkyl group.

43. The method of claim 32, wherein an aromatic group or alkyl group having attached thereto a group containing an active metal center which is capable of reacting with olefin containing species is first formed and then attached onto the particle wherein said aromatic group or alkyl group is directly attached to the particle.

44. The method of claim 32, wherein said polymerizable monomer is a vinyl or diene containing monomer.

45. The method of claim 32, further comprising terminating the —M group.

46. The method of claim 45, wherein said termination is accomplished by replacing the —M group with a proton, by disproportionation, or by replacement with a chemical group other than the —M group.

47. The method of claim 46, wherein said chemical group is a hydroxy group or halide group.

48. A toner composition comprising resin particles and a terminated version of the modified particles of claim 1.

49. An ink composition comprising at least one ink vehicle and a terminated version of the modified particles of claim 1.

50. An inkjet ink composition comprising at least one inkjet ink vehicle and a terminated version of the modified particles of claim 1.

51. A coating composition comprising at least one liquid vehicle and a terminated version of the modified particles of claim 1.

* * * * *